United States Patent
Motomura et al.

(10) Patent No.: US 6,356,712 B1
(45) Date of Patent: Mar. 12, 2002

(54) INSTANT CAMERA WITH IMPROVED PROCESSING LIQUID SPREADING DEVICE

(75) Inventors: Katsumi Motomura, Saitama; Katsuyoshi Asakura, Kanagawa; Mitsuru Shimizu, Saitama; Kiichiro Kitakawa, Kanagawa, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/393,021

(22) Filed: Sep. 9, 1999

(30) Foreign Application Priority Data

Sep. 9, 1998 (JP) .............................. 10-255685
Sep. 10, 1998 (JP) .......................... 10-256173

(51) Int. Cl.$^7$ ............................................. G03B 17/50
(52) U.S. Cl. ........................... 396/32; 396/36; 396/583
(58) Field of Search ................... 396/42, 33, 527, 396/583, 584, 32, 36

(56) References Cited

U.S. PATENT DOCUMENTS

| | | | | |
|---|---|---|---|---|
| 4,319,827 A | * | 3/1982 | Carter et al. ................... 396/33 |
| 4,460,254 A | * | 7/1984 | Hara et al. ..................... 396/33 |
| 5,491,526 A | * | 2/1996 | Shimizu ....................... 396/40 |
| 5,802,402 A | * | 9/1998 | Lippert et al. ............... 396/527 |
| 6,173,120 B1 | * | 1/2001 | Takatori ....................... 396/36 |

\* cited by examiner

Primary Examiner—D Rutledge
(74) Attorney, Agent, or Firm—Young & Thompson

(57) ABSTRACT

A self-developing type of instant camera is equipped with a processing liquid spreading device comprising a pair of pressure-applying processing rollers which ruptures a processing liquid containing pod and distributes a processing liquid in a film unit, a spread controller operative to press and rubs the film unit from one side of the film unit coming out from a film pack so as to spread the processing liquid distributed in the film unit and a guide member, disposed between the spread controller and the film pack, operative to force the film unit from another side of the film unit so as to direct the film unit toward the bite of pressure-applying processing rollers.

11 Claims, 11 Drawing Sheets

INSTANT CAMERA WITH IMPROVED PROCESSING LIQUID SPREADING DEVICE

BACKGROUND OF THE INVENTION

1. Field of the Invention

The present invention relates to a self-developing camera with an improved processing liquid spreading device for processing a self-developing film unit.

2. Description of the Prior Art

A mono-sheet type of self-developing or instant film unit or otherwise called an integrated or non-peel apart type of self-developing or instant film unit (which is hereinafter referred to as an instant film unit for simplicity in the specification) and a variety of self-developing or instant cameras and printers for use with this type of instant film unit have been on the market. The mono-sheet type of instant film unit includes a transparent front cover sheet through which an exposure is made, a rear cover sheet disposed at the back of the front cover sheet, and a photosensitive and an image receiving layer formed between the front cover sheet and the rear cover sheet. The instant film unit further includes a pod containing a processing liquid therein which is placed at the leading end of the instant film unit and a trap operative to catch an excess of processing liquid therein which is placed at the trailing end of the instant film unit. The mono-sheet type of instant film unit is classified into two basic types, namely a reflective type and a transmissive type. In the reflective type, an latent image formed on the photosensitive layer is transferred as a positive image onto the image-receiving layer and after development the positive image is viewed from the side on which the exposure is made. In the transmissive type, on the contrary, a positive image formed on the image receiving layer after development is viewed through the transparent rear cover sheet. The mono-sheet type of instant film unit is otherwise classified into two types in terms of peripheral structures of the instant film unit, namely a spacer type of instant film unit and an outer-frame type of instant film unit. The spacer type of instant film unit has a spacer between the front cover sheet and the rear cover sheet along both sides of the film unit. The spacer has a thickness which governs a distributed thickness of processing liquid by the processing rollers while preventing the processing liquid from leaking or escaping out of the instant film unit during processing. The outer-frame type of instant film unit has a binder frame for binding around the periphery of the instant film unit to securely couple the front cover sheet and the rear cover sheet together so as to prevent the processing liquid from leaking out of the instant film unit during processing. A significant feature of the outer-frame type of instant film unit is that the difference with respect to the front cover or a space over the front cover which is provided by the outer binder frame cooperates with the processing rollers to govern a distributed thickness of processing liquid between a photosensitive and an image receiving layer during processing.

Such instant film units are used together with an instant camera or a printer in the form of a film pack. An instant film unit pack holds a number of instant film units received in a stack therein. The instant camera or the printer for use with the instant film unit is equipped with a processing liquid spreading device operative to spread a processing liquid between the front cover sheet and the rear cover sheet and, more specifically, between the photosensitive layer and the image-receiving layer. The processing liquid spreading device includes a pair of pressure-applying members, such as a pair of processing rollers, by which an exposed instant film unit is processed and advanced to come out of the instant camera or the printer. Some instant cameras have a spread controller which controls a uniform spread and distribution of the processing liquid by rubbing the surface of the instant film unit with pressure while the instant film unit is advanced.

However, in the instant camera equipped with the spread controller, a top of the spread controller projects beyond the natural path of the instant film unit which is directed to a contact line of the pair of processing rollers so as to force the instant film unit to advance in an S-shaped path with an effect of increasing the effect of spread controller. This structure causes from time to time the film unit at the leading end to fail to enter between the processing rollers, as a result of which the instant film unit is crimped or folded. Further ejection of the instant film unit by the processing rollers is completed by a specified time of rotation of a motor. If the instant film unit at its leading end abuts one of the processing rollers and is thereafter bit between and by the processing rollers, an error occurs between an advancing distance of a claw mechanism for advancing the instant film unit and an advanced distance by which the instant film unit is advanced forwarded by the claw mechanism, which results in causing the instant film unit to fail to be fully ejected out of the instant camera even after the processing roller have come to a full stop.

SUMMARY OF THE INVENTION

An object of the invention is to provide an instant camera which ejects an instant film unit out therefrom without crimping, folding or leaving it in the inside thereof while the spread control of processing liquid is made sufficiently to obtain a thin uniform distribution of processing liquid.

It is another object of the invention to provide an instant camera which gives a way that the instant film unit is reliably bit between a pair of processing rollers.

It is still another object of the invention to provide an improved processing liquid spreading device such as a pair of pressure-applying processing rollers particularly suitable for processing an outer-frame type film unit.

According to an embodiment of the invention, the instant camera is provided with a guide member which is disposed facing a spread controller in order to bring the leading end of an instant film unit into a bite of a pair of processing rollers by applying a processing pressure the instant film unit from one side opposite to the side of the instant film unit on which the spread controller rubs.

According to another embodiment of the invention, the processing liquid spreading device facing which an instant film unit egress slot of a film pack is located comprises a pair of pressure-applying processing rollers operative to rupture a pod containing a processing liquid therein and spread and distribute the processing liquid over a photosensitive layer while advancing the instant film unit, and a spread controller which is disposed between the instant film unit egress slot and the pressure-applying processing rollers and controls uniform distribution of the processing liquid between a front cover sheet and a rear cover sheet by giving the instant film unit an S-shaped film path. Either one of the pressure-applying processing rollers has smaller diameter portions at its both ends so as to apply a proper processing pressure on an exposed area of the instant film unit without causing a harmful influence on the uniform layer of processing liquid distribution due to a somewhat thick outer-frame of the instant film unit. The smaller diameter portion of the pressure-applying processing roller is divided into two sections adjacent to each other, namely a first small diameter section and a second small diameter section. The second smaller diameter section which is axially closer to the end of the pressure-applying processing roller is larger in diameter than the first smaller diameter section closer to the central portion of the pressure-applying processing roller. This roller configuration produces some gaps between the pair of pressure-applying processing rollers at their opposite end through which the instant film unit at the outer-framed opposite sides advances while it is processed.

Furthermore the spread controller is adjusted in its width so as not to contact the outer-frame to improve the spread control.

BRIEF DESCRIPTION OF THE DRAWINGS

The foregoing and other objects and features of the invention will be understood more clearly from the following description when read in conjunction with the accompanying drawings, in which the same reference numerals have been used to denote same or similar parts or mechanisms throughout the drawings and wherein.

DETAILED DESCRIPTION OF THE INVENTION

Figure 1:
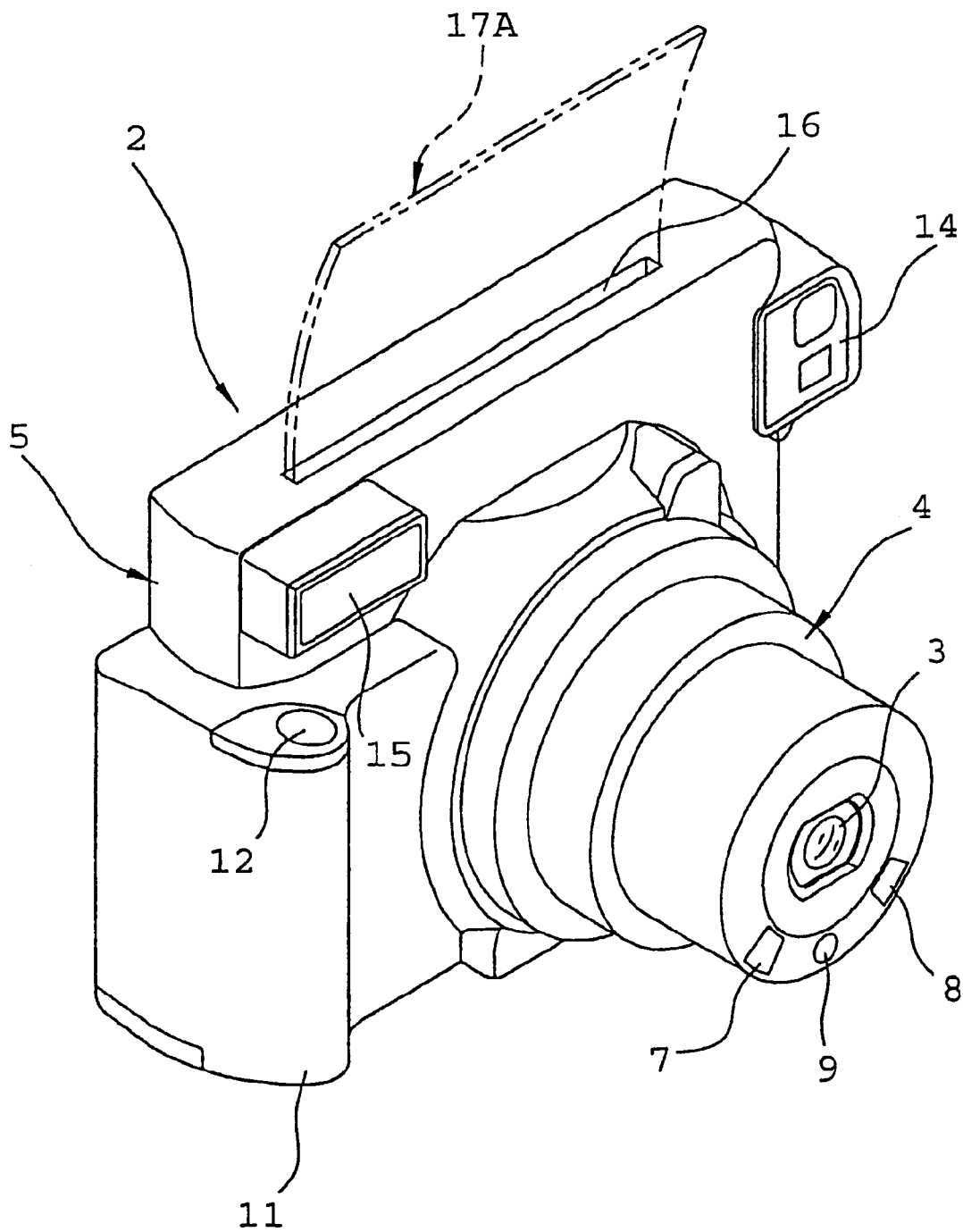
FIG. 1 is a perspective view showing an outer appearance of an instant camera according to an embodiment of the invention.

Referring to the drawings in detail and in particular to FIG. 1 which is a perspective view of an instant camera equipped with a processing liquid spreading device according to an embodiment of the present invention, an instant camera 2 has an approximately rectangular box-shaped camera body 5 into which an instant film unit pack holding a stuck of a number of instant film units 17A is loaded from the back of the camera body 5. A lens barrel 4 in which a taking lens 3 is incorporated is installed to the central area of a front wall of the camera body 5. The lens barrel 4 is of a telescopic type which is extendable from the camera body 5 when the instant camera 2 is used and retractable into the camera body 5 when the instant camera 2 is not used for a good portability. The camera body 5 is equipped with an infrared active distance-measuring type of automatic focussing device which includes a beam projection window 7 through which an infrared beam emanating from an light emitting element is projected toward a subject to be photographed and a reflected beam receiving window 8 through which a beam reflected from the subject enters and impinges a photoelectric element, and an window 9 through which ambient light is received and impinges a photoelectric element for reading scene brightness. Those windows are formed in a front wall of the lens barrel 4.

The camera body 5 is integrally formed with a grip 11 at one of opposite sides. A shutter release button 12 is on the top of the grip 11. The distance-metering and brightness-reading are made when a shutter release button 12 is depressed halfway and shutter-releasing is made when the shutter release button 12 is fully depressed. After framing the subject through a view finder 14 installed in an upper part of the camera body 5, the shutter release button 12 is depressed halfway to fix focussing and an exposure condition, and then fully depressed down to release a shutter incorporated in the lens barrel 4. A built-in electronic flash 15 mounted above the lens barrel 4 flashes automatically when the subject brightness is low.

Figure 2:
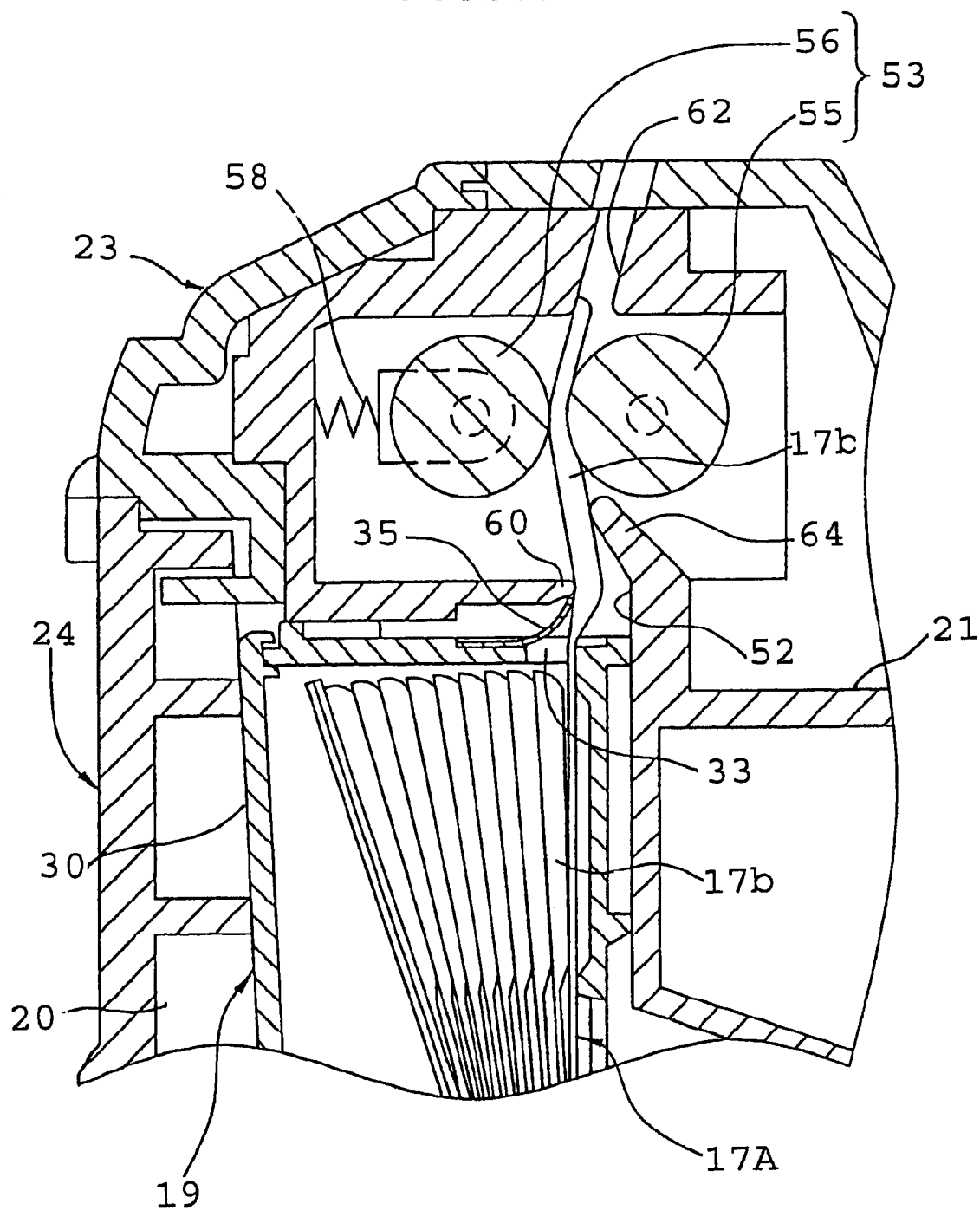
FIG. 2 is a fragmentary cross-sectional view of an overall structure of a pair of pressure-applying processing device and its associated elements of the instant camera.
Figure 3:
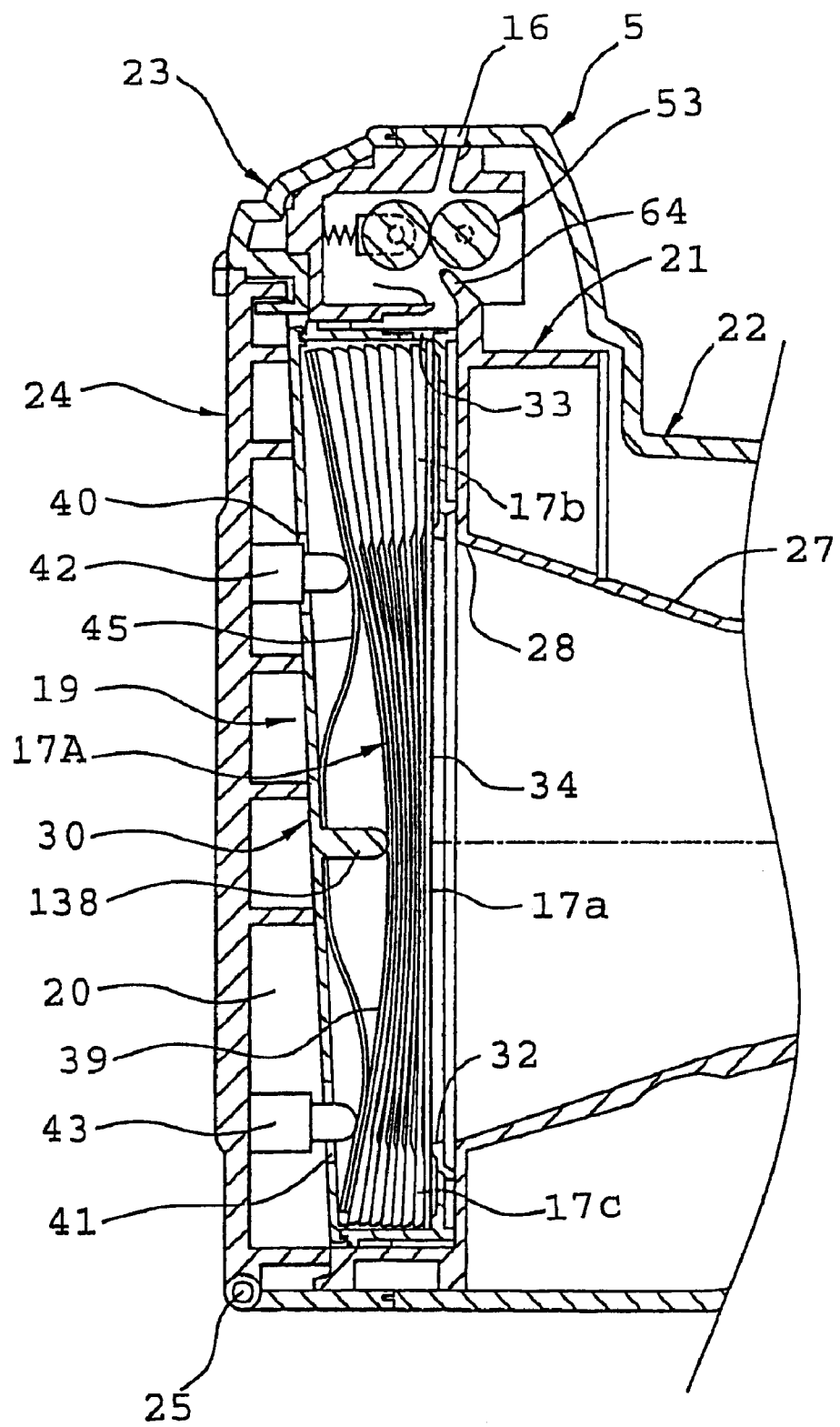
FIG. 3 is a fragmentary cross-sectional view of the instant camera illustrating essential internal structure thereof.
Figure 9A:
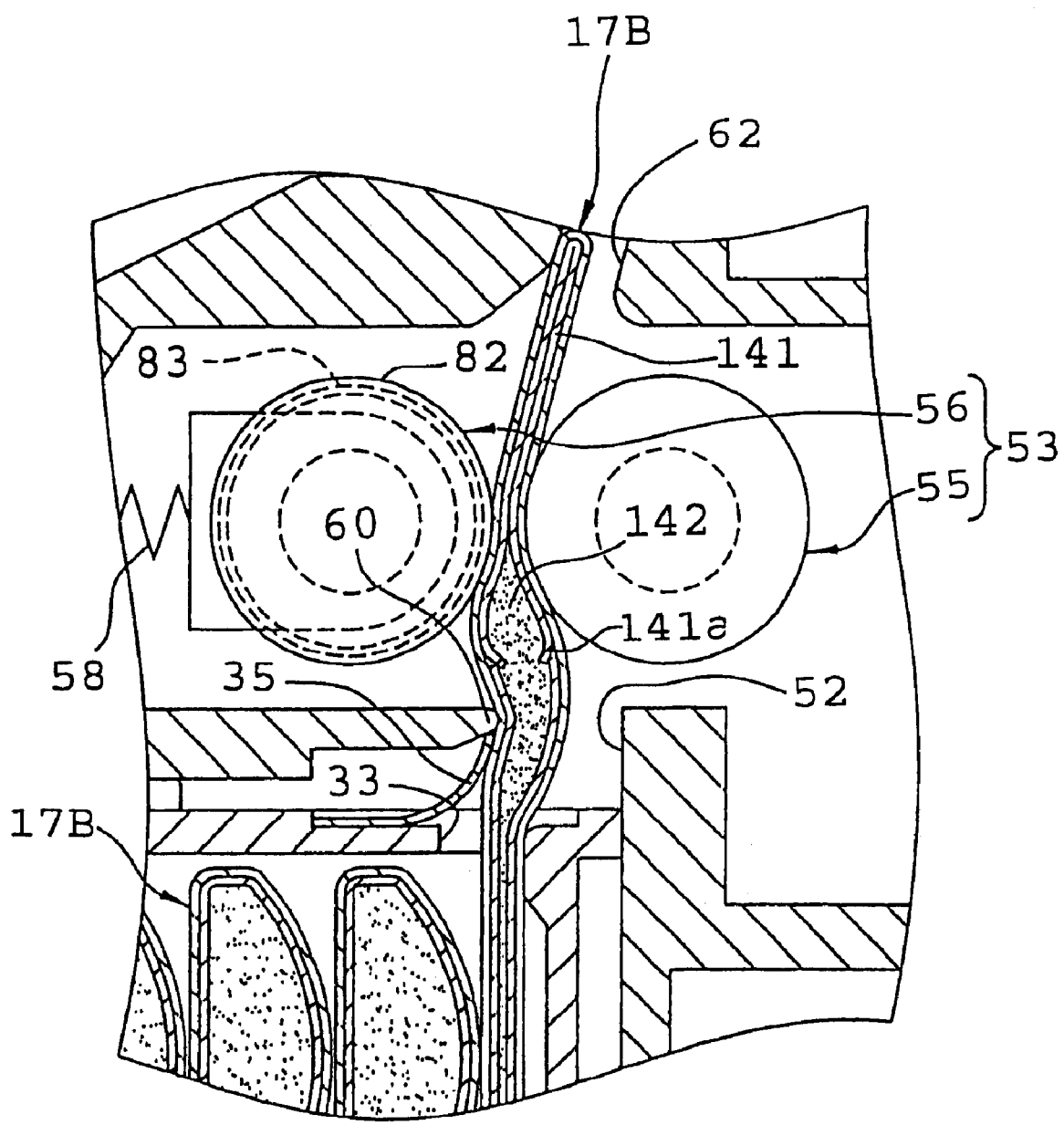
FIG. 9A is an explanatory view of a processing liquid spreading device of the instant camera in which a processing liquid containing pod is ruptured.
Figure 9B:
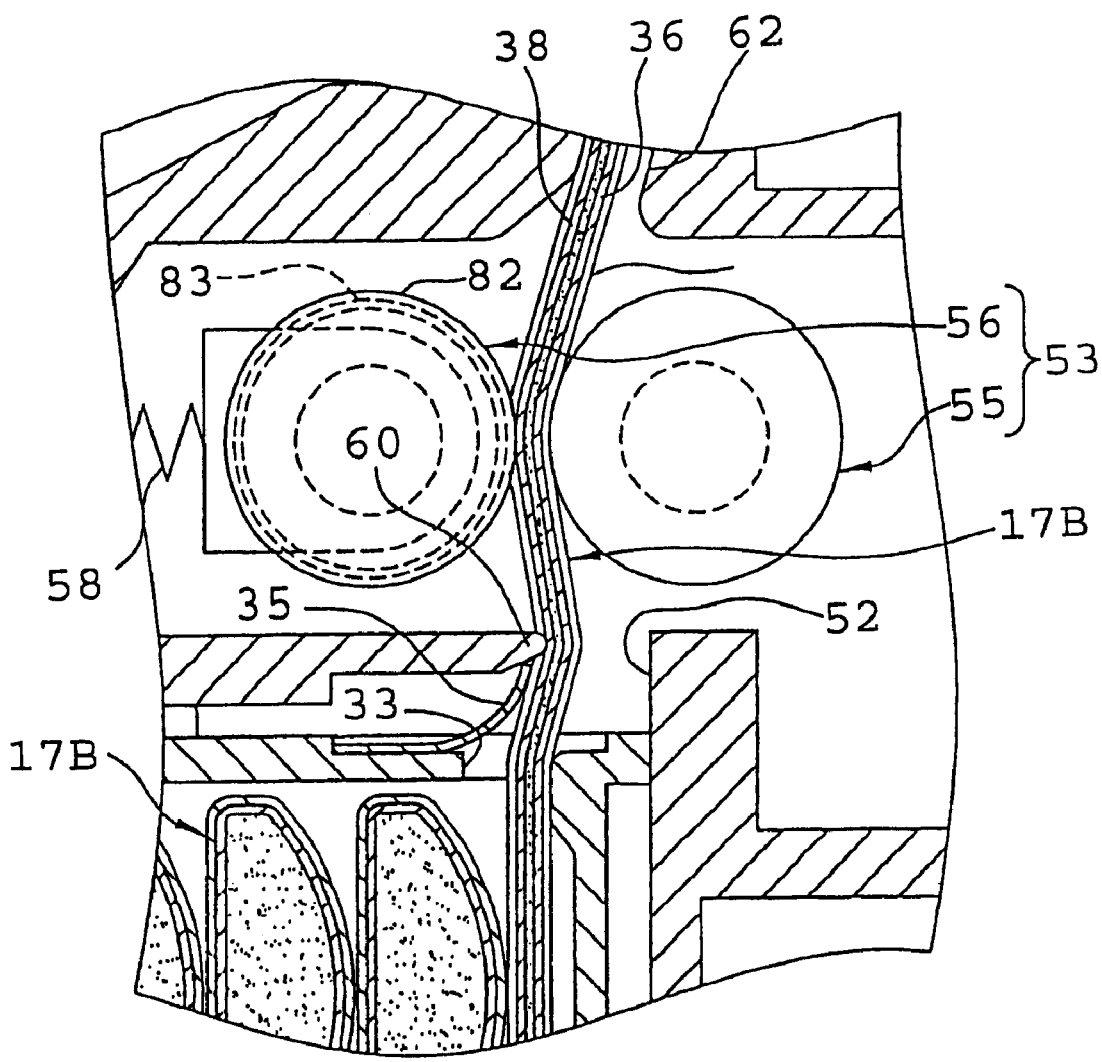
FIG. 9B is an explanatory view of a processing liquid spreading device of the instant camera in which a processing liquid is spread and distributed between front and rear cover sheets of the instant film unit.

As shown in FIG. 3, 9A and 9B, image carrying light rays from the subject through the taking lens 3 are directed through a dark chamber 27 to a photographic layer 37 of a foremost instant film unit 17A whose bound of a generally square or rectangular image-foaming area is defined by an aperture 28 of the camera body 5, a picture framing aperture 32 of an instant film unit pack housing 30 of an instant film unit pack 19 and an peripheral frame 47 of the instant film unit 17A. As shown in detail in FIG. 2 and 3 which are fragmentary cross-sectional views of the instant camera 2, the camera body 5 includes an instant film unit pack receiving chamber 20 formed in the rear section thereof, a base 21 on which a variety of picture taking functional elements (not shown) are mounted, a front cover 22 covering the front of the base 21 and a rear cover 23 covering the back of the camera body 5. The rear cover 23 has a back lid 24 which is pivotally connected thereto with a hinge 25 and is opened and closed when the instant film unit pack 19 is loaded into and unloaded from the pack receiving chamber 20. The dark chamber 27 is formed on the base 21 to keep a light path between the taking lens 3 and the instant film unit pack 19 light-shielded. One open end of the dark chamber 27 forms the aperture 28.

As shown in FIG. 3, the instant film unit pack 19 holds a stuck of a number of instant film units 17A in its open-ended, box-shaped plastic housing 30. Each instant film unit 17A includes a front cover sheet functioning as a transparent window through which an exposure is made, a rear cover sheet disposed opposite to the front cover sheet, a photo-sensitive layer and an image-receiving layer disposed between the front cover sheet and the rear cover sheet and a rupturable pod 17b containing processing liquid at the leading end of the instant film unit 17A and a trap 17c for catching excess processing liquid and solidified at the trailing end of the instant film unit 17A. The user of this type of instant film unit can view and keep the picture without removing any part of the original instant film unit assembly. The instant film pack housing 30 has a picture framing aperture 32 through which the instant film unit 17A is exposed. An instant film unit egress slot 33 is formed in a leading end wall (upper end as seen in FIGS. 2 and 3) of the instant film unit pack housing 30. A virgin instant film unit pack 19 includes a plate-like cover sheet 34 on top of the foremost instant film unit 17A and a flexible light seal 35 across over the instant film unit egress slot 33. These elements are incorporated in the instant film unit pack housing 30 for the purpose of the instant film units 17A from being exposed to light before it is loaded in the camera body 5. First operation of the shutter release button 12 after the instant film unit pack 19 has been loaded causes the plate-like film cover 34 to break the flexible light seal 35 along its weakly adhered part to the leading end wall around the film unit egress slot 33 and come out of the camera body 5 through the instant film unit egress slot 33. On an inner side of a rear wall of the instant film unit pack housing 30 there is provided a main instant film unit raising projection 38 at its central portion. The main instant film unit raising projection 38 raises the stack of instant film units 17A through a light shielding sheet 39 adjacent to the rearmost instant film unit 17A to give a better flatness to the foremost instant film unit 17A. The instant film unit pack housing 30 at the inner side of the rear wall is further provided with two holes 40 and 41 between which the raising projection 38 locates. Those holes 40 and 41 receive other two supplementary instant film unit raising projections 42 and 43 which extend from the back lid 24 to raise the stack of instant film units 17A while the back lid 24 is closed after the instant film unit pack 19 has been loaded in the camera body 5. Each of the supplementary raising projections 42 and 43 is spring-loaded and has a slidably movable top-half portion which is similar to that disclosed in, for example, Japanese Unexamined Patent Publication No. 7-244336. The slidably movable top-half portions push forwardly the stack of the instant film units 17A at the peripheral region to give a better flatness to the foremost instant film unit 17A in cooperation with the main raising projection 138. The holes 40 and 41 are light-shielded by light shielding sheets 45 and 39 before the instant film unit pack 19 is loaded in the camera body 5.

Figure 4:
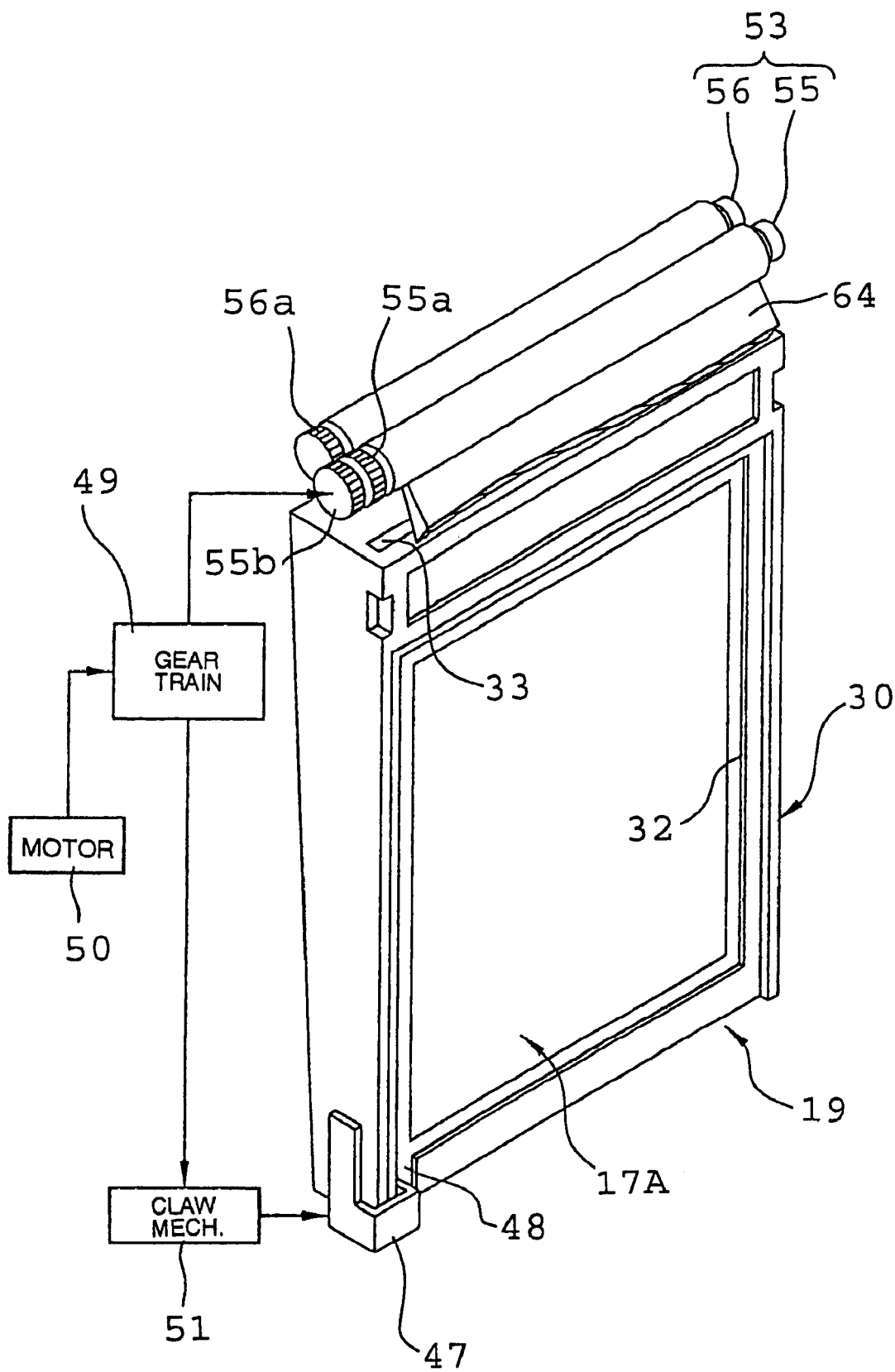
FIG. 4 is an explanatory illustration of an instant film unit advancing mechanism and a processing liquid spreading device of the instant camera.

FIG. 4 shows an instant film unit pack 19 and an instant film unit advancing and processing mechanism. The instant film unit pack housing 30 has a pickup slot or opening 48 in the lower end portion or trailing end portion through which an instant film unit ejecting claw 47 is received. The instant film unit ejecting claw 47 is reciprocally operated by a claw driving mechanism 51 including a motor 50 and a reduction gear train 49 to pick up the foremost exposed instant film unit 17A or the plate-like film cover 34 by engaging the trailing edge of the instant film unit 17A or the plate-like film cover 34 and advance it from the instant film unit pack housing 30 through the instant film unit egress slot 33 until it is bite between the pair of pressure-applying processing rollers 55 and 56 which forms a processing liquid spreading device 53 mounted in a housing 57. A slot-shaped deflected gate 52 is formed between the instant film unit egress slot 33 and the pair of pressure-applying processing rollers 55 and 56 such that it is deviated a little forwardly from the instant film unit egress slot 33 of the instant film unit pack housing 30 as shown in FIG. 2. A spread controller 60 is one of members to form the slot-shaped deflected gate 52 which controls uniform distribution of the processing liquid spread and distributed between the front cover sheet 36 and the rear cover sheet 38 by rubbing the surface of the instant film unit 17A with a certain pressure while the instant film unit is advanced.

Referring to FIGS. 4, 9A and 9B, a tip of the spread controller 60 is formed round to prevent a surface of the instant film unit 17A from being scratched. The top portion of the spread controller 60 at a side facing the instant film unit egress slot 33 is tapered so as to easily guide the leading edge of the instant film unit 17A into the slot-shaped deflected gate 52. One of the pair of pressure-applying processing rollers, namely the processing roller 55, is provided with a drive gear 55a at one of its opposite ends. The drive gear is driven clockwise by the motor 50. Another one of the pair of pressure-applying processing rollers, namely the processing roller 56, is provided with a driven gear 56a at one of opposite ends. The driven gear 56a is in mesh with the drive gear 55a to drive the processing roller 56 counterclockwise. The reduction gear train 49 is arranged between the motor 50 and the drive roller 55a and transmits rotation of the motor 50 to the drive gear 55a at a reduced-speed. These processing rollers 55 and 56 are made of hard steel to minimize a manufacturing error of diameter along the axis of rotation. The driven processing roller 56 is movable in a direction perpendicular to a plane in which the instant film unit 17A is placed and is biased by a spring 58 (see FIG. 2) toward the drive processing roller 55 so as to apply a suitable processing pressure to the instant film unit 17A for uniform spread and distribution of the processing fluid equally on the photographic layer. The motor 50, which drives the pair of pressure-applying processing rollers 55 and 56 in opposite directions and the claw drive mechanism 51, is started in response to exposure of the foremost instant film unit 17A to automatically advance the exposed instant film unit 17A for processing and ejecting it. The pair of pressure-applying rollers 55 and 56 are disposed so that the contact line or bite line between the drive roller 55 and the driven roller 56 is disposed directly above the tip of the spread controller 60. Such disposition forces the instant film unit 17A to advance along a gentle S-shaped passage between the bite line of the pair of pressure-applying rollers 55 and 56 and the instant film unit egress slot 33. This curvature brings a better spread because the spread controller 60 increases its compressive force onto the instant film unit 17A when stroking the instant film unit 17A while it advancing. The position of the bite line is obviously not limited to the aforementioned position, directly above the tip, as long as an S-shaped curve is formed. Furthermore the camera body 5 is formed with a slant passage 62 extending from the vicinity of the bite line to an instant film unit egress slot 16 (see FIG. 1) is slanted forwardly with an effect of increasing a contact area between the processing liquid containing pod 17b of the instant film unit 17A and the drive processing roller 55 and of providing a reliable spread and distribution of the processing liquid.

A guide member 64, which is formed as an integral part of the camera base 21 and, more specifically, as an integral part of the instant film unit pack receiving chamber 20, is disposed facing the spread controller 60 in the vicinity of the slot-shaped deflected gate 52. The guide member 64 is designed wide enough to contact the instant film unit 17A along an entire width and applies a pressure to the instant film unit 17A in the direction toward the spread controller 60 with an effect of bending the instant film unit 17A so as to guide the leading edge of the instant film unit 17A into the bite of the pair of pressure-applying processing rollers 55 and 56. A tip of the guide member 64 is also formed round to prevent the instant film unit 17A from scratches.

To summarize a series of operation to have a viewable image on the instant film unit 17A, first of all the instant film unit pack 19 is loaded into the instant film unit pack receiving chamber 20 of the camera body 5 and the instant camera is powered on. Then the shutter release button 12 is depressed once to eject the film cover 34. Ejection may be automatically done in response to closing the back lid 24 of the camera body 5. After ejecting the film cover 34, the photographer frames a subject to be photographed through the finder 14 and depresses halfway the shutter release button 12 to automatically adjust the camera condition of focussing and exposure. Distance to the subject for focussing is measured by the infrared active type of automatic focussing device which includes the infrared emitting element behind the beam projection window 7 and the infrared photoelectric element behind the reflected beam receiving window 8. Light-reading for determining an exposure condition is done through the metering window 9 by a well-known technique. These windows 7 and 8 are disposed on the front of the lens barrel 4 as well as the taking lens 3. Then the shutter incorporated in the lens barrel 4 is released according to the camera condition already set upon fully depressing the shutter release button 12. The electronic flash 15 above the lens barrel 4 flashes automatically when the subject brightness is low. Image carrying light rays from the subject through the taking lens are directed through the dark chamber 27, the aperture 28 of the camera body 5, the picture framing aperture 32 of the instant film unit pack housing 30 and the exposure plane 17a (see FIG. 3) of the front cover sheet 36 onto the photographic layer of the foremost instant film unit 17A.

The motor 50, which drives both pressure-applying processing rollers 55 and 56 and claw drive mechanism 51, is actuated in response to the shutter releasing, so as to cause the claw drive mechanism 51 to move the claw 47 upward in the pickup slot 48 in the trailing end (lower end) portion of the instant film unit pack housing 30. The claw 47 engages the trailing end of the plate-like film cover 34 or the foremost instant film unit 17A and advances it from the instant film unit pack housing 30 through the instant film unit egress slot 33. The leading edge of the instant film unit 17A advances through the instant film unit egress slot 33 with breaking the flexible light seal 35 toward the tapered surface of the top portion of the spread controller 60 and reaches the slot-shaped deflected gate 52 with being guided by the tapered surface. Then the guide members 64, which is disposed opposed to the spread controller 60, guides the leading end into the bite of the pair of pressure-applying processing rollers 55 and 56. As the guide member 64 certainly feeds the leading end of the instant film unit 17A into the bite of the pair of pressure-applying processing rollers 55 and 56, the instant film unit 17A will be never crimped or folded, or be left in the camera body 5 without being ejected from the camera body 5 in the specified time in which the pair of processing rollers 55 and 56 rotate. The processing liquid containing pod 17b at the leading end of the instant film unit 17A is ruptured by the pair of pressure-applying processing rollers 55 and 56 while the leading end of the instant film unit 17A advances toward the instant film unit egress slot 33. The processing liquid discharged from the pod 17b is spread out and distributed between the front cover sheet 36 and the rear cover sheet 38 of the instant film unit 17A. The instant film unit 17A is finally fed into the slant passage 62 and ejected outside of the camera body 5 through the instant film unit egress slot 33. This increases a contact area between the processing liquid containing pod 17b of the instant film unit 17A and the drive processing roller 55, which also serves to provide a better spread of processing liquid.

The processing liquid spread between the front cover sheet 36 and the rear cover sheet 38 of the instant film unit 17A is uniformly spread out by the aid of spread controller 60 before being compressed by the pair of pressure-applying processing rollers 55 and 56. The spread controller 60 is integrally-formed with the camera base 21 and the drive processing roller 55 operative to urge the instant film unit 17A toward the spread controller 60 is fixed onto the same camera base 21, so as to give a mechanically very stable relationship between the instant film unit 17A and the spread controller 60 while the instant film unit 17A advances, which helps the spread controller function well without having fluctuation. The processing rollers can be mounted on the same members where the pair of pressure-applying pressure rollers 55 and 56 are mounted on with the same effects as described above. Thus after a certain period of time a viewable image is formed on the instant film unit 17A with high quality because of uniform spread and distributed processing liquid.

In the embodiment described above, the guide member 64 is designed wide enough to cover contact with the instant film unit 17A along its entire width. It is also possible to use a less wide single guide member which contacts only a central portion of an instant film unit 17A or a plurality of narrow guides which contact across the instant film unit 17A.

The instant camera of the aforementioned embodiment of the invention is adaptable to both spacer-type of instant film unit and outer-frame type of instant film unit. Hereinafter an instant camera according to another embodiment of the invention which is particularly suitable for the outer-frame type of instant film unit is described.

Figure 6A:
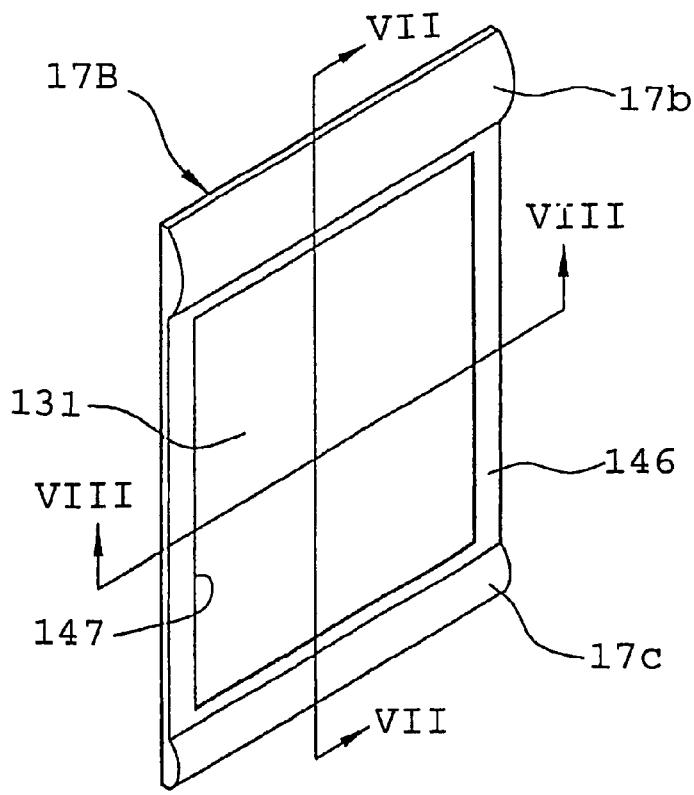
FIGS. 6A and 6B are perspective views showing an appearance of a transmissive outer-frame type of instant film unit used in the instant camera shown in FIG. 5.
Figure 6B:
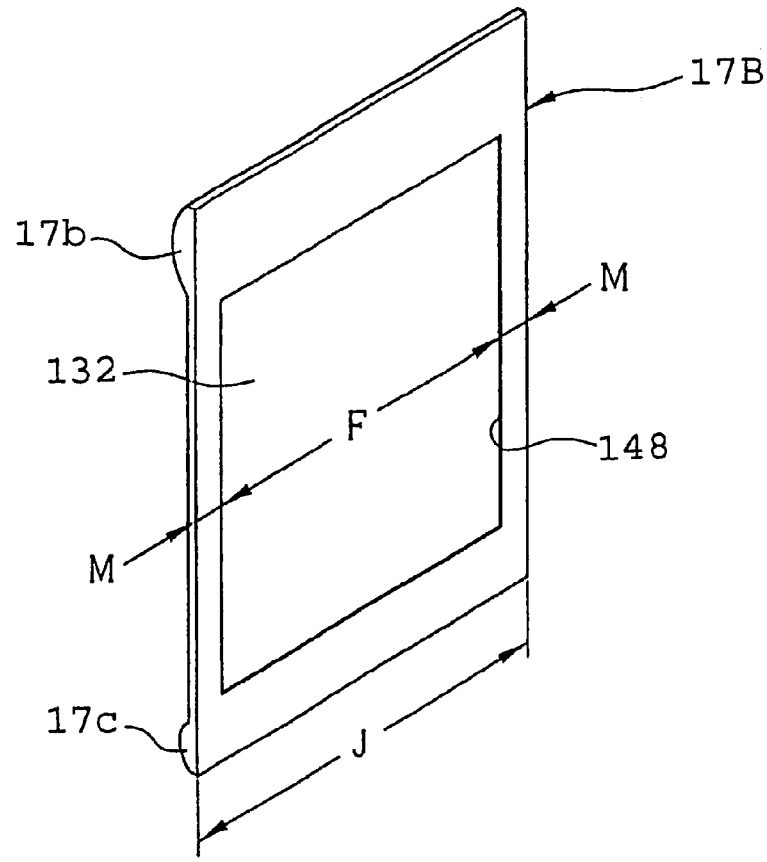

FIGS. 6A, 6B, 7 and 8 show a transmissive outer-frame type of instant film unit 17B. FIG. 6A shows the instant film unit 17B which is viewed from the exposed side thereof and FIG. 6B shows the other side of the instant film unit 17B from an image viewable side on which the positive image on the image receiving layer is viewed. The transmissive outer-frame type of instant film unit 17B includes an exposure plane 31 through which the instant film unit 17B is exposed, an image-forming plane 132 disposed opposite to the exposure plane 131, a pod 17b containing processing liquid at the leading end and a trap 17c for trapping an excess of processing liquid at the trailing end.

Figure 7:
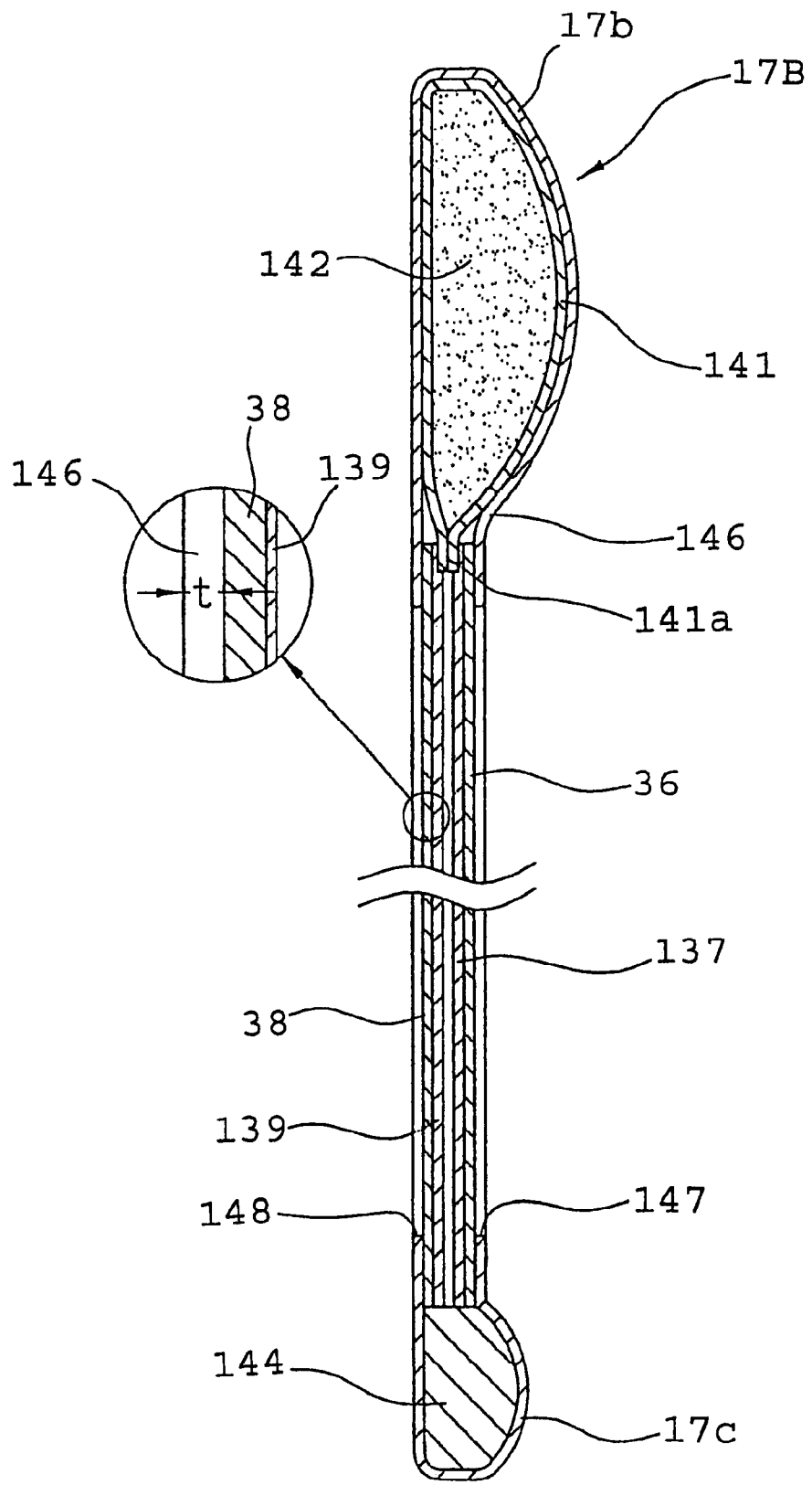
FIG. 7 is a cross-sectional view of the instant film unit taken along line VII—VII of FIG. 6A.
Figure 8:
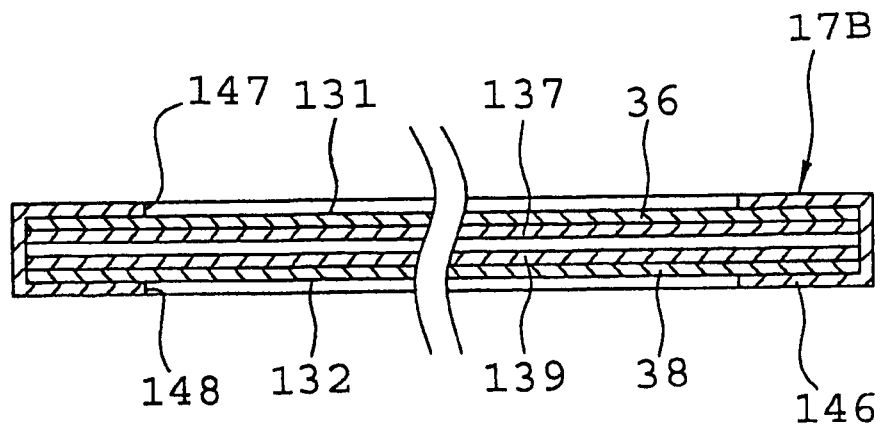
FIG. 8 is a cross-sectional view of the instant film unit taken along line VIII—VIII of FIG. 6A.

Referring to FIGS. 7 and 8 which are longitudinal and transverse sectional views of the instant film unit 17B taken along line VII—VII and line VIII—VIII of FIG. 6A, respectively, a photosensitive layer 137 is formed adjacent to a front cover sheet (an exposure side) 36 which is made of a transparent plastic film and an image receiving layer 139 including a reflective layer is formed on a rear cover sheet (an image viewable side) 38 which is made of a transparent plastic film. The processing liquid containing pod 17b comprises a bag-shaped pod cover 141 and a processing liquid 142 contained in the bag-shaped pod cover 141. The bag-shaped pod cover 141 at transverse sides 141a interposed between the leading transverse ends of the front and rear cover sheets 36 and 38 is weakly adhered to each other. The bag-shaped pod cover 141 is ruptured along its weakly adhered part 141a to allow the processing liquid 142 to flow out thereof and spread out between the front and rear cover sheets 36 and 38. The trap 17c comprises a liquid absorption pad 144 which is made of a material efficiently absorbing the processing liquid 142 and is disposed along the trailing transverse end of the instant film unit 17B. The transmissive outer-frame type of film unit 17B is one whose elements are bound and wrapped around along its peripheral margins by an outer-frame sheet 146 (see FIG. 6A) to secure the front cover sheet 36 and the rear cover sheet 38 together with the processing liquid containing pod 17b and the trap 17c. The outer-frame sheet 146 forms an exposure frame 147 by which a generally square or rectangular image-forming area is defined on the front of the instant film unit 17B and a picture viewing frame 148 by which a generally square or rectangular image-viewable area on the back of the instant film unit 17B.

Figure 5:
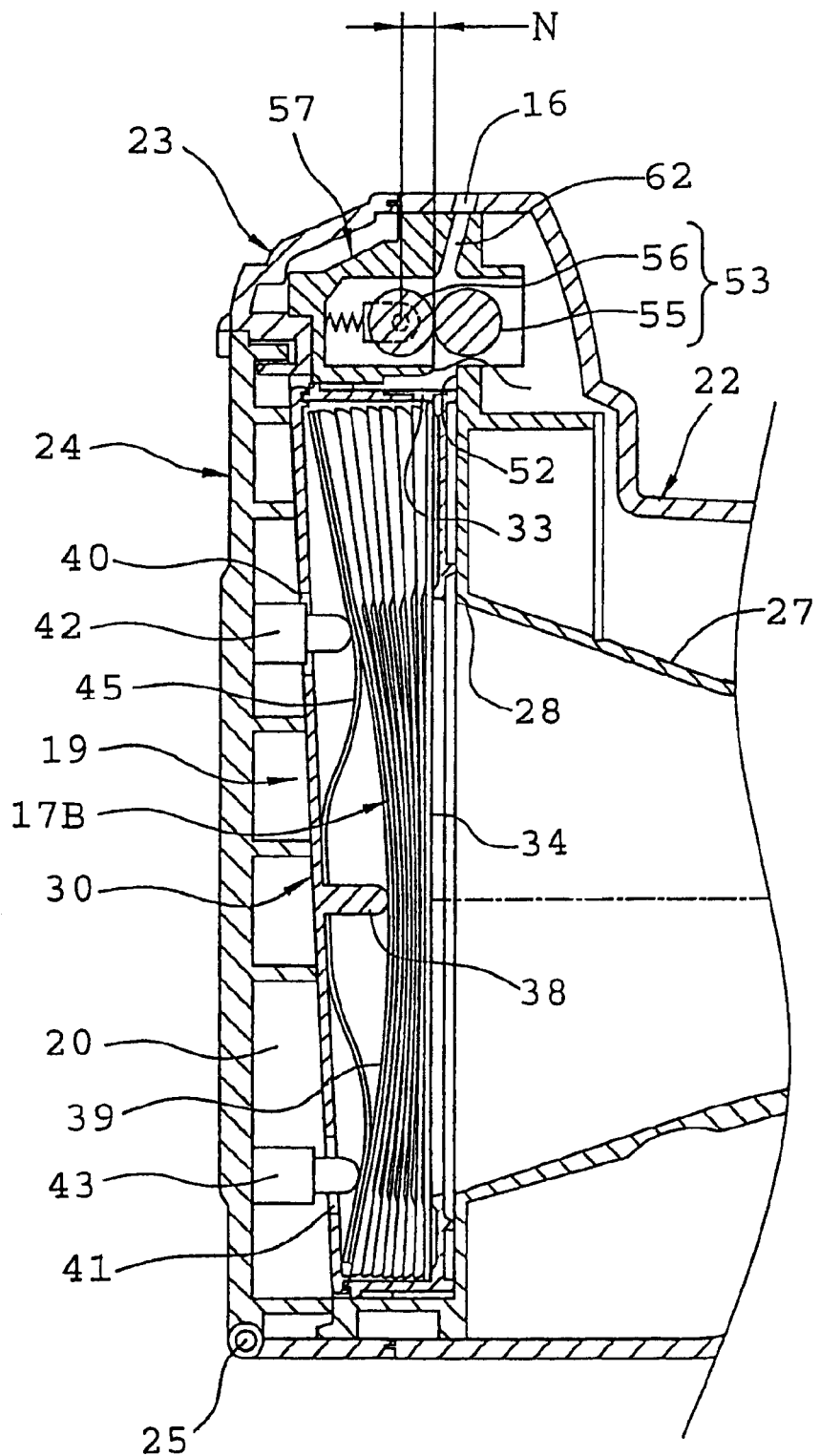
FIG. 5 is a fragmentary cross-sectional view of an essential internal structure of an instant camera according to another embodiment of the invention.
Figure 11:
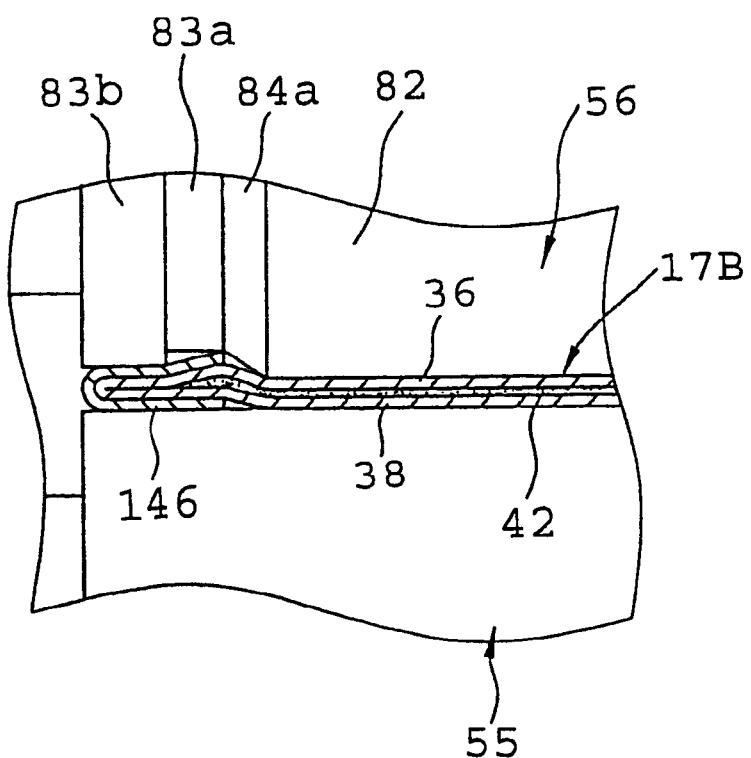
FIG. 11 is an explanatory illustration partly showing the pressure-applying processing rollers between which an instant film unit is bit.
Figure 10:
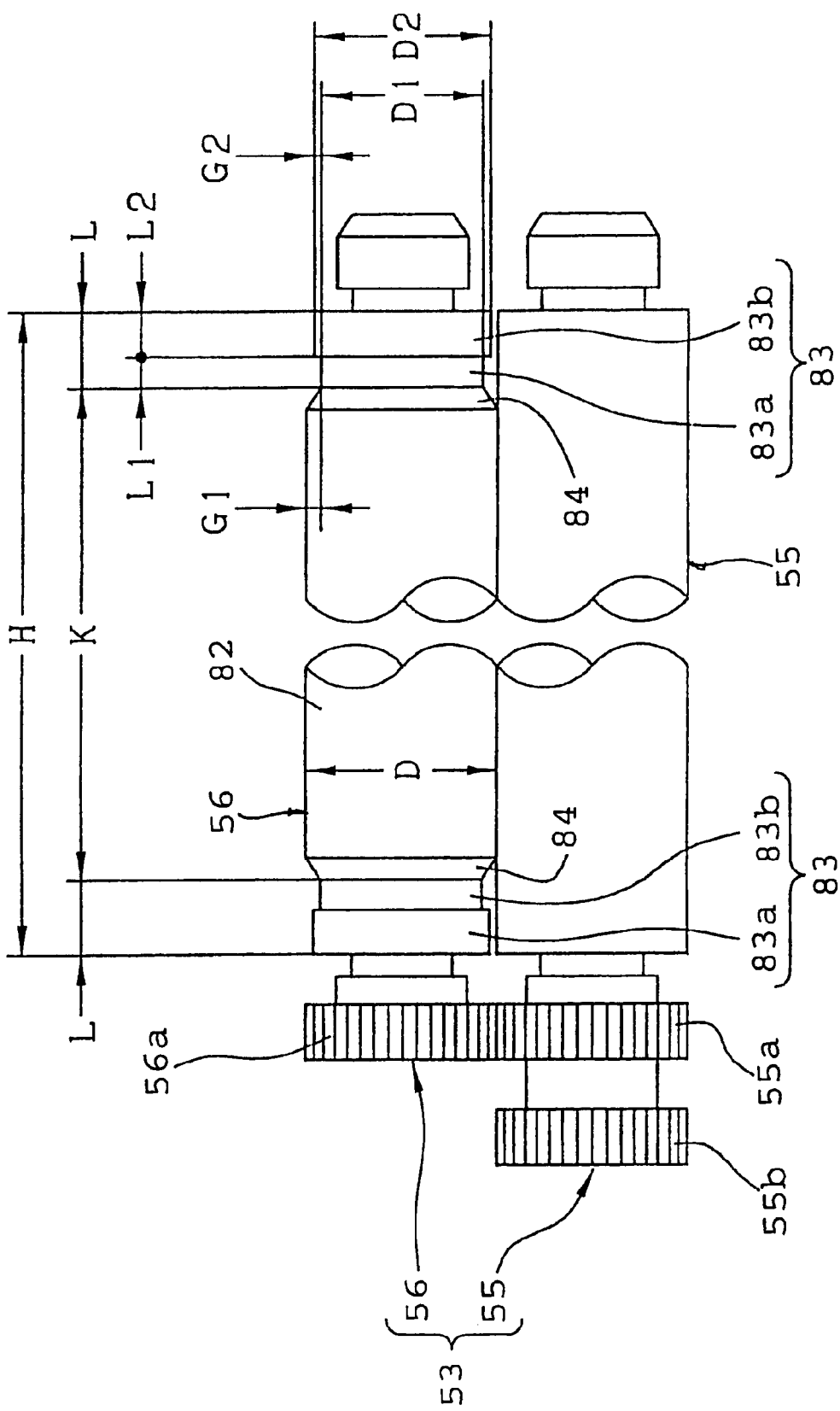
FIG. 10 is an illustration showing a dimensional configuration of a pair of pressure-applying processing rollers used in an instant camera according to still another embodiment of the invention.

FIGS. 5, 10 and 11 show a processing liquid spreading devices for spreading and distributing a processing liquid particularly suitable for the transmissive outer-frame type of instant film unit 17B. As shown, the processing device is similar to that shown in FIGS. 2 and 3 excepting that the aforementioned guide member 64 is not provided. A processing liquid spreading device 53 comprises a first pressure-applying processing roller 55 which contacts the rear cover sheet 38 and a second pressure-applying processing roller 56 which contacts the front cover sheet 36. Most of the constructions described before about the processing liquid spreading device including the processing rollers assembly and a spread controller 60 are applicable to this embodiment. As shown in FIG. 10, the second processing roller 56 is divided into two portions one of which is a central liquid spreading portion 82 and contacts and presses the rear cover sheet 38 and the other of which are opposite end portions 83 adjacent to the central liquid spreading portion 82 and have a smaller diameter than the central liquid spreading portion 82. Each of the end portions consists 83 comprises a first smaller diameter portion 83a closer to the central liquid spreading portion 82 and a second smaller diameter portion 83b located outside the first one 83a. Relation among the diameters "D", "D1" and "D2" of the central liquid spreading portion 82 the first smaller diameter portion 83a and the second smaller diameter portion 83b is given by D>D2>D1. A gap indicated by "G1", which is defined as a difference between halves of the diameters "D" and "D1" of the central liquid spreading portion 82 and the first smaller diameter portion 83a, is approximately equal to the thickness "t" of the outer-frame sheet 146 of the instant film unit 17B (see FIG. 7). Likewise a gap indicated by "G2", which is defined as a difference between halves of the diameters "D1" and "D2" of the first and second smaller diameter portions 83a and 83b, is approximately equal to the thickness of a layer of properly spread and distributed processing liquid 142. The length "H" of the first processing roller 55 and the second processing roller 56 is approximately equal to the width "J" of the instant film unit 17B (see FIG. 6B). The length "K" of the central liquid spreading portion 82 of the second processing roller 56 is a little less than the width "F" of the image-viewable area defined by the picture viewing frame 148 (see FIG. 6B). The total length "L" of the lengths "L1" and "L2" of the first and second smaller portions 83a and 83b is approximately equal to the width "M" of the lateral side frame part of the outer-frame sheet 146 (see FIG. 6B). The second processing roller 56 is formed with a tapered portion 84 between the central liquid spreading portion 82 and the first smaller diameter portion 83a. The width of the spread controller 60 is a little less than the width F of the image-viewable area defined by the picture viewing frame 148 so that the transverse end portion of the spread controller 60 do not contact with the lateral side frame part of the outer-frame sheet 146.

As shown in FIG. 11, the opposite side frame parts of the outer-frame sheet 146 are nipped between the second smaller diameter portion 83b of the second pressure roller 56 and the first processing roller 55. This forms a proper gap for spreading processing liquid 142 between the central liquid spreading portion 82 of the second processing roller 56 and the first processing roller 55 without having a harmful effect from the existence of the outer-frame sheet 146 when the instant film unit 17 is nipped. Furthermore, as the diameter of the first smaller diameter portion 83a of the second processing roller 56 is smaller than that of the second smaller diameter portion 83b, a space of which thickness equals to the height "t" of the outer-frame sheet 146 is formed between the first smaller diameter portion 83a and the first processing roller 55 while the instant film unit 17 is nipped. Therefore, the processing liquid 142 can easily flow into the edge area under the space so as to form a high quality of picture even at its marginal area. The tapered portion 84 can bend smoothly the rear cover sheet 38 and the image receiving layer 39, which prevents the instant film unit 17B from cracks caused by stress concentration on the rear cover sheet 38 and helps the processing liquid 142 expand to the marginal area of the picture viewing frame 148 and the exposure frame 147.

The first and second processing rollers 55 and 56 are made of hard steel to minimize manufacturing errors of diameter and other dimensions along the axis of rotation. The length "K" of the central liquid spreading portion 82 of the second processing roller 56, the width of the spread controller 60, the distance "N" between the center of the second processing roller 56 and the tip of the spread controller 60 and other dimensions with respect to those elements relating to the processing liquid spreading device 53 are determined according to the size and other physical characteristics of the instant film unit 17B.

Although the above described embodiment of the processing liquid spreading device is adapted suitably for the transmissive type of instant film unit as an example, obviously the processing liquid spreading device can be suitably used for the reflective of instant film unit as long as the instant film unit is of an outer-frame type.

It is to be understood that whereas the present invention has been described in detail with respect to preferred embodiments, nevertheless, various other embodiments and variants are possible which are within the spirit and scope of the invention, and such are intended to be covered by the following claims.

What is claimed is:

1. A self-developing type of instant camera adapted to accept an instant film unit pack, the instant camera having a processing liquid spreading device including a pair of pressure-applying processing rollers for rupturing a processing liquid contained pod provided in the instant film unit pack and distributing said processing liquid from said processing liquid contained pod, said processing liquid spreading device comprising:

a spread controller disposed before said pressure-applying processing rollers for pressing and rubbing said instant film unit from one of opposite sides of said instant film unit so as thereby to spread said processing liquid distributed in said instant film unit; and a guide member disposed between said spread controller and said pressure-applying processing rollers for forcing said instant film unit from another of said opposite sides of said instant film unit so as to direct a leading end of said instant film unit toward a bite of said pressure-applying processing rollers;

wherein both the spread controller and the guide member are disposed outside the instant film unit pack and are permanently attached to the instant camera.

2. The instant camera of claim 1, wherein the guide member is inclined at an acute angle to a plane defined by a contact edge of said spread controller and a bite line of said pressure-applying processing rollers.

3. A self-developing type of instant camera adapted to accept an instant film unit pack, the instant camera having a processing liquid spreading device including a pair of pressure-applying processing rollers for rupturing a processing liquid contained pod provided in the instant film unit and distributing a processing liquid from said processing liquid contained pod over in an instant film unit ejected through an egress slot of the instant film unit pack loaded in the instant camera in which a stack of instant film units is packed, said processing liquid spreading device comprising:

a spread controller disposed before said pressure-applying processing rollers for pressing and rubbing said instant film unit coming out from said instant film unit pack through said egress slot from one of opposite sides of said instant film unit so as to spread said processing liquid distributed in said instant film unit, said spread controller having a top end which is located in close proximity to said egress slot of said instant film unit pack loaded in said instant camera and projected beyond a natural path in which said instant film unit coming out from said instant film unit travels; and a guide member disposed between said spread controller and said pressure-applying processing rollers, said guide member being inclined with respect to and toward a plane in which said top end of said spread controller and a bite line of said pressure-applying processing rollers are so as to force said instant film unit from another of said opposite sides of said instant film unit, thereby directing a leading end of said instant film unit toward said bite line of said pressure-applying processing rollers;

wherein both the spread controller and the guide member are disposed outside the instant film unit pack and are permanently attached to the instant camera.

4. A self-developing type of instant camera as defined in claim 3, wherein said guide member provides an approximately S-shaped film unit path between said spread controller and said bite line of said pressure-applying processing rollers.

5. A self-developing type of instant camera as defined in claim 3, wherein the top end of said guide member has a rounded profile.

6. The instant camera of claim 3, wherein the guide member is inclined at an acute angle to a plane defined by a contact edge of said spread controller and a bite line of said pressure-applying processing rollers.

7. A self-developing type of instant camera for use with an instant film unit pack in which a stack of instant film units is received, said instant film unit being of a type having peripheral margins of said instant film unit bound and wrapped by an outer-frame sheet and having a processing liquid contained pod provided on said instant film unit, said processing liquid spreading device comprising:

a pair of pressure-applying processing rollers for rupturing said processing liquid pod and distributing a processing liquid from said processing liquid containing pod over in an exposed instant film unit coming out from said instant film unit pack, one of said pressure-applying processing rollers having opposite end portions smaller in diameter than the remaining center portion; and a spread controller disposed before said pressure-applying processing rollers for pressing and rubbing said exposed instant film unit from one of opposite sides of said instant film unit so as to spread said processing liquid distributed in said instant film unit;

wherein said remaining center portion of said one pressure-applying processing roller cooperates with another said pressure-applying processing roller to distribute said processing liquid over an exposed area of said exposed instant film unit;

wherein each said end portion is divided into two sections, first one of said two sections being adjacent to said remaining center portion and second one of said two sections being larger in diameter than said first section and remote from said remaining center portion with respect to said first section, so that said second section of said one pressure-applying processing roller and said another pressure-applying processing roller interposes a side margin of said exposed instant film unit to advance forward said exposed instant film unit and said first section of said one pressure-applying processing roller and said another pressure-applying processing roller interpose said side margin to form a space in the inside of said instant film unit along said side margin which receives an excess of said processing liquid distributed over said exposed area.

8. A self-developing type of instant camera as defined in claim 7, wherein said spread controller has a top end which is located in close proximity to said egress slot of said instant film unit pack loaded in said instant camera and projects beyond a natural path in which said instant film unit coming out from said instant film unit travels.

9. A self-developing type of instant camera for use with an instant film unit pack in which a stack of instant film units is received, said instant film unit being of a type having peripheral margins of said instant film unit bound and wrapped by an outer-frame sheet and having a processing liquid contained pod provided on said instant film unit, said processing liquid spreading device comprising:

a pair of pressure-applying processing rollers for rupturing said processing liquid pod and distributing a processing liquid from said processing liquid containing pod over in an exposed instant film unit coming out from said instant film unit pack, one of said pressure-applying processing rollers having opposite end portions smaller in diameter than the remaining center portion;

a spread controller disposed before said pressure-applying processing rollers for pressing and rubbing said exposed instant film unit from one of opposite sides of said instant film unit so as to spread said processing liquid distributed in said instant film unit; and a guide member disposed between said spread controller and said pressure-applying processing rollers, said guide member being inclined with respect to and toward a plane in which said top end of said spread controller and a bite line of said pressure-applying processing rollers are so as to force said instant film unit from another of said opposite sides of said instant film unit, thereby directing a leading end of said instant film unit toward said bite line of said pressure-applying processing rollers;

wherein said remaining center portion of said one pressure-applying processing roller cooperates with another said pressure-applying processing roller to distribute said processing liquid over an exposed area of said exposed instant film unit.

10. A self-developing type of instant camera as defined in claim 9, wherein said guide member provides an approximately S-shaped film unit path between said spread controller and said bite line of said pressure-applying processing rollers.

11. A self-developing type of instant camera as defined in claim 9, wherein the top end of said guide member has a rounded profile.

* * * * *